United States Patent [19]

Lhureau et al.

[11] Patent Number: 5,392,181
[45] Date of Patent: Feb. 21, 1995

[54] MAGNETO-OPTICAL READING HEAD

[75] Inventors: Jean-Claude Lhureau, Saint Genevieve Des Bois; Christian Maillot, Orsay, both of France

[73] Assignee: Thomson-CSF, Puteaux, France

[21] Appl. No.: 922,876

[22] Filed: Jul. 31, 1992

[30] Foreign Application Priority Data

Aug. 9, 1991 [FR] France ................... 91 10177

[51] Int. Cl.6 .............................................. G11B 11/10
[52] U.S. Cl. ........................................................ 360/114
[58] Field of Search ........................................... 360/114

[56] References Cited

U.S. PATENT DOCUMENTS

| 4,618,901 | 10/1986 | Hatakeyama et al. | 360/114 |
| 4,654,837 | 3/1987 | Browder | 360/114 |
| 4,943,131 | 7/1990 | Taki | 350/96.12 |

FOREIGN PATENT DOCUMENTS

| 0436424 | 7/1991 | European Pat. Off. . |
| 60-224139 | 8/1985 | Japan . |
| 1522281A | 2/1988 | U.S.S.R. . |

Primary Examiner—Robert S. Tupper
Attorney, Agent, or Firm—Oblon, Spivak, McClelland, Maier & Neustadt

[57] ABSTRACT

The disclosure relates to a magneto-optical reading head. A magneto-optical head comprises an optically active part which is a very thin magnetic layer that causes the rotation of the plane of polarization of the light as a function of its magnetic polarization which is itself linked to the magnetic polarization of the magnetic tape that bears the information elements to be read and moves past the thin layer. Instead of using a focusing optical device to illuminate the optically active part, it is provided that the head will comprise an optical guide which ends directly before the active part and is such that the plane of incidence of the light rays on the optically active part is perpendicular to the general direction of elongation of a gap region before which the magnetic tape passes. There is also provision, preferably, for a photosensitive sensor (linear array) that is integrated into the head so as to be at a distance of less than a few micrometers from the optically active part on the path of the beam modulated by this part. FIG. 5.

14 Claims, 8 Drawing Sheets

SECTION BB
ENLARGED

MAGNETO-OPTICAL READING HEAD

BACKGROUND OF THE INVENTION

1. Field of the Invention

The invention relates to optical reading on a magnetic recording medium.

The following is the general principle of the magneto-optical effect (Kerr or Faraday effect): a thin layer of magnetic material, illuminated by a light beam, modifies the properties of this beam in a way that depends on the magnetic polarization of the layer.

Consequently, the writing of information elements on a magnetic tape is magnetic writing, but the reading is optical reading.

The nature of the modification of the light beam may be varied: it may entail the modification of the reflection coefficient, the introduction of a variable delay of optical phase or, again, a variation of the plane of polarization of a polarized light. It is the last-named phenomenon that is the easiest to use.

2. Description of the Prior Art

In practice, it is not possible to carry out a direct reading, by means of an optical beam, of the magnetic information elements recorded on the tape. A magneto-optical transducer, which constitutes the reading head of the system, is used. This transducer has a thin magnetic layer capable of giving rise to a magneto-optical effect. The tape, which bears magnetic information elements, moves past the head in its immediate vicinity and induces modifications of the magnetic flux in the thin layer of the head. It is towards this thin layer and not towards the band that a reading laser beam is directed.

Figure 1:
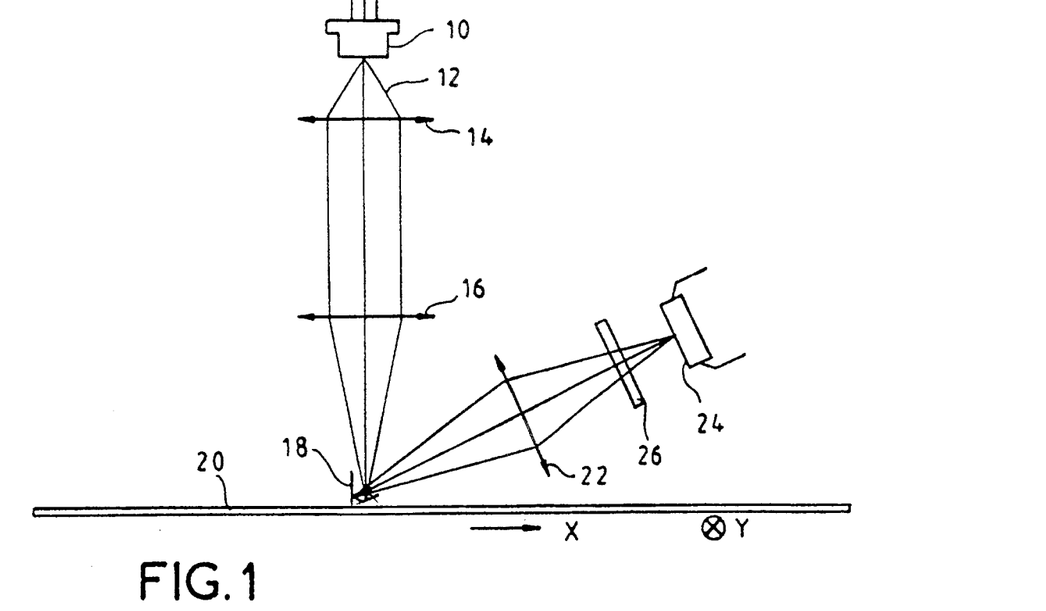
FIG. 1, already described, represents the general principle of a magneto-optical reading system.

A known magneto-optical reading system is built in the manner shown schematically in FIG. 1: a light source 10 (preferably a semiconductor laser diode) emits a beam 12 which is collimated by a collimator 14 and focused by a lens 16 on the reading head 18, and especially on the magneto-optical thin layer located in the vicinity of the magnetic tape 20 to be read. The beam is reflected by the thin layer, and the plane of polarization of the reflected light undergoes a rotation that depends on the magnetic polarization of the thin layer. This magnetic polarization itself depends on the direction of magnetic polarization of the portion of tape that is passing before the reading head. The reflected beam is focused by a lens 22 on a photosensitive head 24, in passing through a polarization analyzer 26. The electrical signal given by the photosensitive device depends on the rotation of polarization of the light, hence on the magnetic polarization of the tape at each instant. Naturally, a very high precision of relative positioning of these elements is necessary.

SUMMARY OF THE INVENTION

The invention is aimed at making it easier to build a more compact, high-performance magneto-optical reading system.

According to the invention, there is proposed an optical reading system that comprises a reading head to read magnetic information elements recorded on a magnetic medium, the head comprising an open magnetic circuit with a gap region designed to be placed in the immediate vicinity of the medium that is to be read to modulate the magnetic circuit as a function of the magnetic information elements of the medium, this gap region being narrow and elongated, the magnetic circuit also comprising an optically active magnetic layer placed in the immediate vicinity of the gap region, the layer being capable of receiving and modulating a light beam as a function of the magnetic information elements recorded on the medium, wherein said reading head comprises an optical waveguide integrated with the head, leading directly to the optically active magnetic layer, the plane of incidence of a light ray guided by this layer and reaching the optically active layer being perpendicular to the general direction of elongation of the gap.

The expression "plane of incidence" of a light ray is taken to mean the plane formed by this ray and the normal to the surface at which this ray ends; it is then also the plane defined by the incident ray and the reflected ray.

The gap is elongated in a direction that is oblique or perpendicular (but not parallel) to the direction in which the magnetic medium (magnetic tape in principle) to be read and the head relatively move past each other.

This use of a waveguide that is accurately oriented with respect to the direction of elongation of the gap makes it possible to arrive at a particularly compact head that enjoys excellent possibilities of multitrack reading, high sensitivity, and far greater ease of construction in the form of an integrated monolithic head. In particular, in the preferred version of the invention, the magnetic layers and the optical waveguide may be made by the deposition of successive layers on a same head surface and not on surfaces at 90° with respect to one another.

The head according to the invention does not have a reading head and an optical system external to the head that focuses an illumination beam on the optically active part of the head with varying degrees of precision and with varying difficulty of adjustment. On the contrary, it has an optical waveguide integrated with the head, which leads directly to the optically active part which is itself integrated with the head. There is therefore no problem whatsoever of adjustment and precision since the waveguide is part of the head (it is integrated by monolithic integration techniques at the same time as the optically active part of the head and, preferably, on the same side).

According to another major characteristic of the invention, it is possible to provide for the positioning of a photosensitive sensor at a distance of less than a few micrometers from the optically active zone, on the path of the light beam modulated by this zone, so that this sensor receives this beam directly without any intermediate optical focusing system. Naturally, should the reading use the rotation of polarization of light, a polarization analyzer will be interposed on the path of the modulated beam, between the optically active part and the photosensitive sensor.

The sensor will preferably be constituted by an array of photosensitive elements extending in a direction parallel to the direction of elongation of the gap.

The construction of a magneto-optical reading head according to the invention may be of the planar or non-planar type. In the preferred technique, which is planar, the magnetic layers and the layers that constitute the gaps are deposited on a plane face parallel to the surface before which the magnetic tape to be read will move past. In the non-planar technique, the magnetic layers are formed in a bevelled substrate and the tape moves past the tip of the bevelling, obliquely or perpendicularly to the surface on which the magnetic layers have been deposited.

In a particular planar method of construction, the magnetic layers and the waveguide will be deposited on a substrate which already has a photosensitive sensor. There is then total monolithic integration of the reading head, as much for illumination as for optical modulation and for opto-electronic conversion.

One particularly advantageous possibility of manufacture consists in using a technique for the transfer of substrates: the magnetic circuit and the waveguide for the illumination of the optically active part are made on the front face of a first substrate, and the analyzer and the photosensitive sensor are made on the front face of a second substrate. The two substrates are bonded to each other by their front faces, and the rear face of the first substrate is machined until that part of the magnetic circuit in relation to which the magnetic tape has to move past is made to appear on the surface.

Generally, the photosensitive sensor will be a linear array of several photosensitive elements if a multitrack reading is to be done (there will be as many photosensitive elements as there are tracks). The illumination beam and the corresponding waveguide will be flat (with a thickness of some micrometers for a width preferably corresponding to the entire length of the magnetic tape, measured perpendicularly or, as the case may be, obliquely with respect to the direction in which the tape moves past). The plane of the flat guide is then a plane parallel to the direction of elongation of the gap.

The illumination beam may be introduced into the waveguide either by a system of lenses (which, however, do not need to have great focusing precision) or by an optical fiber or bundle of optical fibers, or again by a laser diode bonded directly to the reading head at a place where an edge of the waveguide is flush with the surface.

BRIEF DESCRIPTION OF THE DRAWINGS

Other features and advantages of the invention shall appear from the following detailed description, made with reference to the appended drawings, of which.

MORE DETAILED DESCRIPTION

Figure 2:
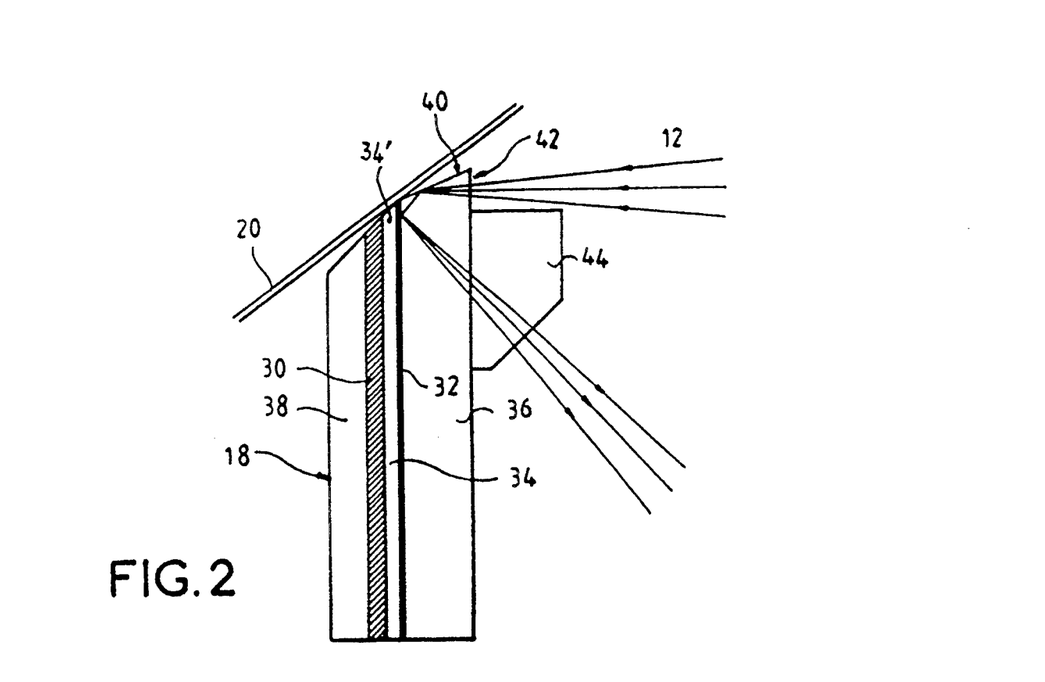
FIG. 2 shows a corresponding reading head.

FIG. 2 shows a magneto-optical reading head that has been proposed in the laboratories of the Applicant. This head is a non-planar head in which a magnetic circuit has been formed by means of two parallel bands 30 and 32 made of magnetic material (sendust). These two bands are formed on a transparent substrate 36; they are separated by a non-magnetic layer 34, and they are coated with a protection layer 38, made of alumina for example.

A magnetic tape 20 moves past a bevelled zone of the head, at a place where the ends of the two layers of magnetic material 30 and 32 are flush with the surface. It therefore moves past a gap region 34' defined by the end of the non-magnetic layer 34. In this way, the magnetic tape encloses, by one side, the magnetic circuit constituted by the two layers of sendust 30 and 32. On the other side, the magnetic circuit may be considered to be closed at infinity owing to the great length of the layers 30 and 32 as compared with the width of the non-magnetic layer 34.

The layer 32 of magnetic material is very thin (with a thickness of several hundreds of angströms). The layer 30 is far thicker (with a thickness of several thousands of angströms at least). It is the end of the layer 32, in the immediate vicinity of the gap region 34', hence of the magnetic tape, which is the optically active part of the device.

The substrate 36 is transparent. It has a machined head 40 at the end of the head which is in the immediate vicinity of the place where the magnetic head bearing the information elements to be read closes the magnetic circuit, and is on the thin layer 32 side.

The laser beam 12 for the illumination of the optically active part is introduced into the transparent substrate, for example by a face 12 parallel to the plane of the thin layer 32. It is totally reflected by the face 40 towards the optically active layer 32, very near the end of the head, namely very near the magnetic tape. The beam is reflected with a polarization rotation dependent on the magnetic polarization of the tape, and it emerges through the transparent substrate and then goes towards a photosensitive sensor as indicated with reference to FIG. 1. Prisms such as 44 may be provided for, to enable the entry or exit of the beam into or from the substrate. The direction of the beam could be reversed.

Figure 3:
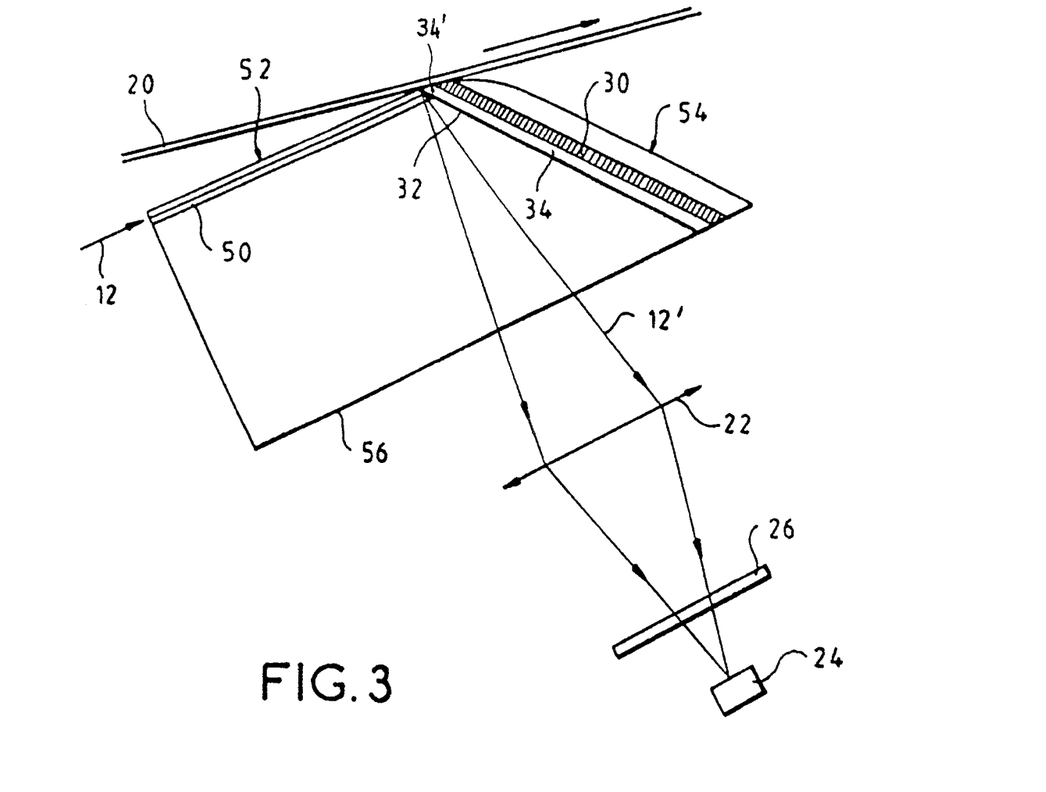
FIG. 3 shows a reading head with optical waveguide according to the invention.

The reading head according to the invention is shown in FIG. 3 which relates to the case of a non-planar structure.

It has an optically active part which may be of the same nature as in the case of FIG. 2: on a transparent substrate 56, two plane, parallel magnetic layers 30 and 32, separated by a non-magnetic layer 34, the optically active layer being the very thin layer 32. The useful part of the gap is the region 34' which is located at the end of the layers 30 and 32, in the immediate vicinity of the magnetic tape. This useful part 34' constitutes a narrow and elongated gap, in a direction which is preferably perpendicular to the plane of the figure and is parallel to the plane of the magnetic medium that is to be read.

The illumination of the optically active layer by the light beam is done by means of an optical waveguide 50 of very small thickness (of some hundreds of angströms to some micrometers) integrated with the substrate 56. The waveguide arrives directly at the optically active part, namely at the end of the layer 32, very close to the place where the magnetic tape 20 moves past. And the illumination achieved by means of this waveguide is such that the plane of incidence of the light rays on the end of the thin layer 32 is perpendicular to the general direction of elongation of the gap 34' at the end of the layers 30 and 32.

The waveguide is oriented obliquely with respect to the plane of the magneto-optical layer 32 in such a way that the incident beam can get reflected on this layer (with modulation of polarization in the case of a layer that acts on the rotation of the polarization plane of the light) and in such a way that the beam is sent back in another direction in order to be analyzed.

In practice, consequently, the reading head may comprise two main faces that are oblique with respect to each other: the first face 52 is parallel to the waveguide which is formed very close to the surface of this first face; the second face 54 is essentially parallel to the plane of the layers 30 and 32 which form the magnetic circuit. This arrangement with two faces that are oblique with respect to each other is related to the fact that the layer 32 is plane throughout its length. As shall be seen further below, it is possible to consider other structures, known as planar structures owing to the method of their manufacture, wherein the layer 32 is plane on almost its entire length except in the active part illuminated by the laser beam.

The optical waveguide of the head according to the invention will, in practice, be a flat guide of very small height (some micrometers at most) but of great width (of some millimeters) to enable the illumination of the layer 32 on a width which is the total width of the magnetic tape to be read. This arrangement is not obligatory, but it clearly has the advantage of enabling a multitrack reading on the entire width of the band, provided that the reflected light beam is analyzed point by point throughout its length, for example by an array of photosensitive elements, the number of which is equal to the number of tracks to be read.

In the exemplary embodiment shown schematically in FIG. 3, the reflected beam 12' coming from the optically active region of the head goes through the substrate 56 which, for this reason, is transparent. As in the embodiment of FIG. 1, it is possible to make provision for the beam 12' to come out of the substrate and be focused by a lens 22 towards a photosensitive sensor 24 in going through a polarization analyzer 26.

In the case of a flat beam, for multitrack reading, the lens 22 is a cylindrical lens in principle: it focuses the beam, in the form of a narrow linear band, on the sensor which is then a multiple-point linear sensor placed in the plane of this band perpendicularly to the direction of the beam (perpendicularly to the plane of FIG. 3).

Figure 4:
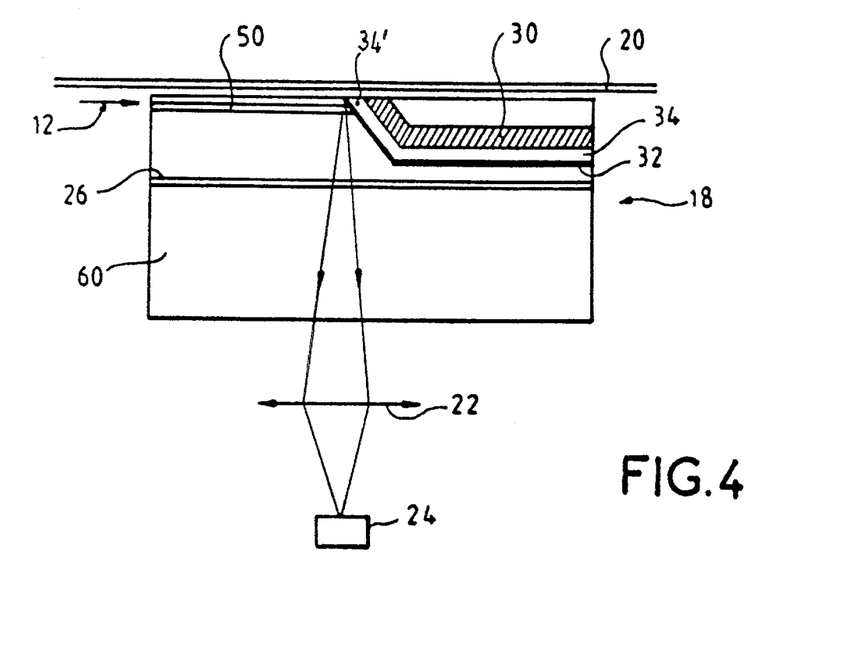
FIG. 4 shows a reading head with a photosensitive sensor directly adjacent to the substrate in which the optically active part of the reading head has been made.

An exemplary embodiment of the invention in a planar structure is shown in FIG. 4. The appellation "planar" is used herein because the manufacture is done by the deposition of different layers (optical, magnetic, insulator and other layers) on only one plane surface of a substrate. Paradoxically, it should nonetheless be clearly seen that the optically active layer 32 is no longer plane as in the above figures but has a flexure precisely at the position where it is illuminated by a light beam.

The reading head herein comprises a transparent substrate 60 on the surface of which the following layers are formed:
  optionally, a metal layer etched in a network forming a polarization analyzer 26; indeed, the return beam will go through the substrate perpendicularly to its upper surface and it can therefore be analyzed while it is on this path; however, it is possible to provide for the analyzer to be located elsewhere;
  the magnetic layers 30 and 32 separated by the non-magnetic layer 34; the active layer 32 is beneath; the layers 30 and 32 are parallel to the upper surface of the substrate, except at their end where they rise obliquely up to the upper surface of the head in such a way that the magnetic tape to be read can close the magnetic circuit in passing before the rising ends of the layers 30 and 32 separated by a gap;
  the optical guide 50, in a plane parallel to the upper surface of the substrate and very close to the final surface of the head; this guide ends on the rising part of the optically active layer 32; the inclination of this rising part is preferably such that the beam arriving from the waveguide is reflected downwards by the rising part of the layer 32.

The illumination beam arriving by the flat waveguide in parallel to the plane surface of the head is therefore reflected downwards, crosses the transparent substrate 60, emerges from the rear by the lower face, and is sent on, as earlier, towards a focusing optical system 22 and a photosensitive array 24. The analyzer 26, it will be recalled, is preferably integrated into the head 18.

Here again, the waveguide directs the light rays to the rising part of the layer 32 with an oblique incidence. The plane of incidence (the plane containing the incident light ray, the reflected ray and the normal to the layer 32) is perpendicular to the general direction of elongation of the gap, this direction being in principle perpendicular to the plane of FIG. 4.

This embodiment is particularly advantageous because it enables a highly intensive monolithic integration of the head, owing to the fact that the optical guide and the magnetic layers may be formed by deposits of layers on a single main surface of the head.

According to a particularly advantageous characteristic of the invention, it is also proposed to eliminate the focusing optical system 22 with the problems of precision, adjustment and cost that it raises, by placing a photosensitive sensor in the immediate vicinity of the optically active layer, so that the beam modulated by the magneto-optical layer does not have the possibility of diverging greatly before it reaches the photosensitive elements.

This particular feature of the preferred embodiment of the invention is independent of whether or not the illumination of the optically active part is done by a waveguide, but it is greatly facilitated by the presence of the waveguide.

If it is to be possible to make use of a sensor without any intermediate focusing optical device, whereas the width of the magnetic tracks to be read is equal to hardly a few micrometers, the sensor must be placed at a maximum distance of several tens of micrometers from the active zone in the return direction of the reflected light beam; if not, the natural divergence of the beam reflected by the optically active layer would very soon result in a mixture of information elements among the tracks.

The idea of the invention, therefore, is to place the photosensitive elements along the optically active zone, at a distance of less than some tens of micrometers from this zone on the path of the beam reflected by this zone.

Figure 5:
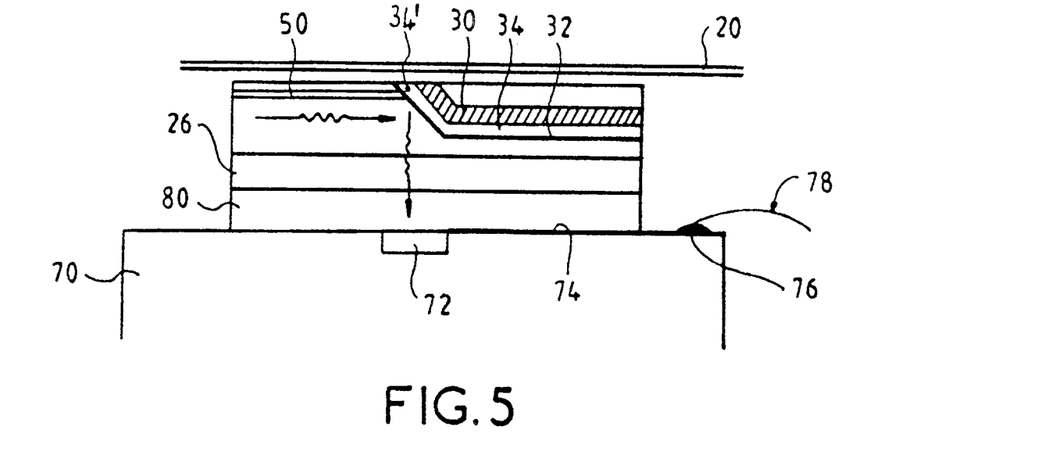
FIG. 5 shows a reading head with a photosensitive sensor directly integrated with the head without an intermediate optical focusing system.

FIG. 5 shows an exemplary embodiment of the invention in which the photosensitive elements are quite simply integrated into the substrate bearing the optically active layer.

As in FIG. 4, an optical waveguide 50 and the magnetic layers 30 and 32, separated by the non-magnetic layer 34 are integrated on a same substrate 70. The difference between this figure and FIG. 4 is the fact that the initial substrate, on which the polarization analysis layer 26 and then the optical and magnetic layers are deposited, is a photosensitive sensor, the photosensitive elements of which are formed on the surface.

In this case, the distance between the rising active part of the layer 32 and the photosensitive elements may effectively be smaller than a few micrometers.

In FIG. 5, the reference 70 designates a substrate which may be a silicon chip bearing photosensitive elements 72 on its upper surface. The photosensitive elements 72 are connected by metallizations 74 to external connection pads 76. Connection wires 78 may be soldered to these pads for the transmission of electrical signals to the exterior of the chip. The charges generated in the photosensitive elements can also be transferred by MOS (metal oxide conductor) or CCD (charge-coupled device) circuits. On the substrate, there is deposited a transparent planarization layer 80 (glass in suspension for example), then the layer 26 serving as a polarization analyzer (it is for example a metal layer etched in the form of a grid with parallel bars in a single direction). Then, the optical and magnetic layers are formed by operations of deposition and etching according to a planar method that shall be described further below.

In all the figures, we have shown a cross-section in a plane transversal to the width of the magnetic tape (and hence longitudinal to the direction in which the tape is moving past): this means that the following facts are not brought out:

the illumination beam is preferably flat and extends throughout the width of the magnetic tape;
the waveguide is also flat;
the two layers of the magnetic circuit are plane and their end close to the magnetic tape extends throughout the width of the tape; in the case of FIG. 5, each of the layers is elbowed and hence has the shape of a dihedron, with a horizontal plane parallel to the plane of the waveguide and a plane that rises obliquely towards the surface of the head to section the plane of the waveguide;
the photosensitive sensor comprises a multiplicity of photosensitive elements in line, also on a distance equal to the width of the tape (or an image of this width if the optical system 22 does not have an enlargement of 1).

Finally, the figures show the oblique plane of the rise of the layer 32 as a plane substantially at 45° to the plane of the waveguide. However, if the angle is different, it is necessary to plan the position of the photosensitive elements accordingly so that the light beam is truly reflected towards them.

A detailed description shall now be given of the possibilities of the practical manufacture of the device according to the invention.

In a first example (FIGS. 6a to 6g), it is sought to make a structure of the type shown in FIG. 3.

Figure 6A:
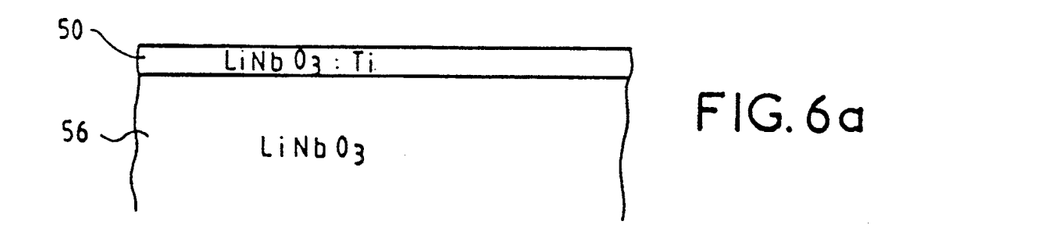
FIGS. 6a to 6g show the main steps of manufacture according to a first manufacturing method (using non-planar technology)

The method starts, for example, with a lithium niobate substrate 56 (FIG. 6a).

This substrate is doped superficially on its' front face, on a thickness that can range from several hundreds of angstroms to some micrometers, to make the waveguide 50. The dopant is titanium which makes it possible to increase the refraction index.

Then a deposition is made (FIG. 6b) of an abrasion-resistant hard layer 80, for example a layer of alumina $Al_2O_3$ having a refraction index lower than that of titanium-doped niobate to demarcate the thickness of the guide. The thickness of this layer is small (some thousands of angstroms for example) for it is this thickness that will determine the proximity of the waveguide with the final upper surface of the head. The refraction index of this layer should be lower than that of the waveguide 50 so that the latter truly works like a guide.

Figure 6B:
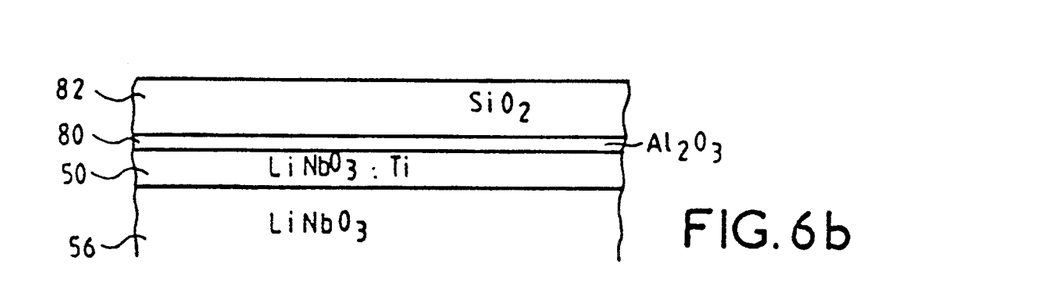
Figure 6C:
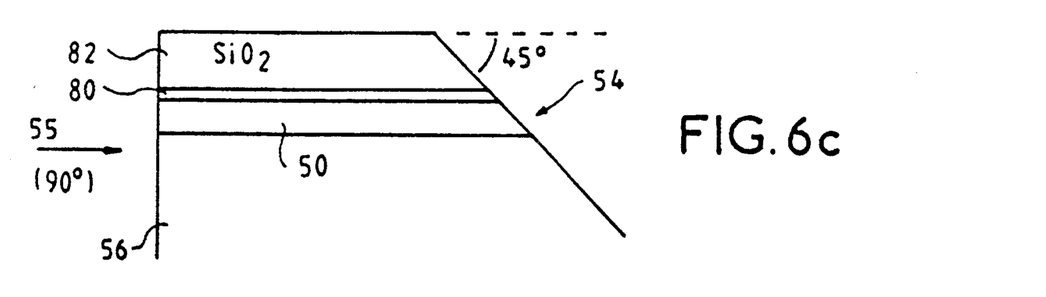

An intermediate protection layer 82, for example a layer of silicon oxide SiO or $SiO_2$ with a thickness of some micrometers, is then deposited. It will be eliminated subsequently by abrasion.

The faces of the substrate 56 are machined (FIG. 6c) to as to define the face 54, preferably at 45° to the upper face on which the waveguide has been formed. The face 55, opposite the face with the 45° bevelling, is preferably machined to 90° so as to define a reference plane perpendicular to the plane of the waveguide. It is by this face 55 that the illumination beam will be introduced. The two planes thus machined intersect each other along to a line parallel to the upper face of the substrate. The angle formed by the upper face and the face at 45° is an obtuse angle.

Figure 6D:
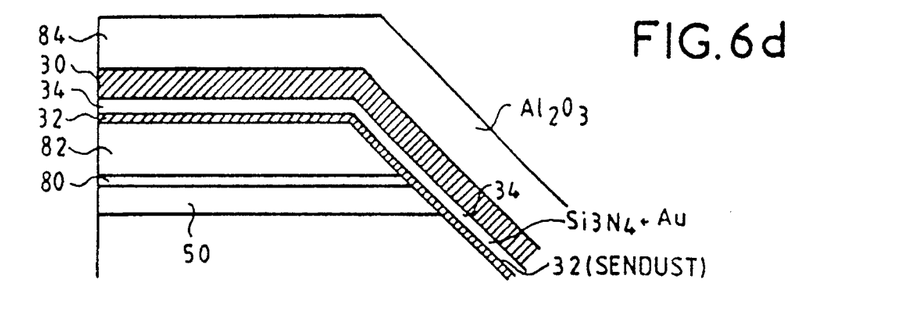

The first thin magnetic layer 32 is then deposited. Here it is a sendust layer with a thickness of about 300 angstroms, which is deposited uniformly on the upper face and on the face at 45° (FIG. 6d).

This layer is covered with a non-magnetic layer 34, preferably made of silicon nitride. This layer has a thickness of some thousands of angstroms and it may be covered with a gold layer having a thickness of some hundreds of angstroms (preferably about 700 angstroms), these two layers together forming the gap layer 34.

Then, the second magnetic layer 30 is deposited. Like the layers 32 and 34, the layer 30 is deposited both on the upper face and on the face, at 45°, of the substrate 56. The layer is some thousands of angstroms, for example 5000 angstroms.

Finally, a protection layer 84 of alumina may be deposited (with a thickness of several micrometers, for example five micrometers). This layer will subsequently remain on the face at 45° but not on the upper face.

Figure 6E:
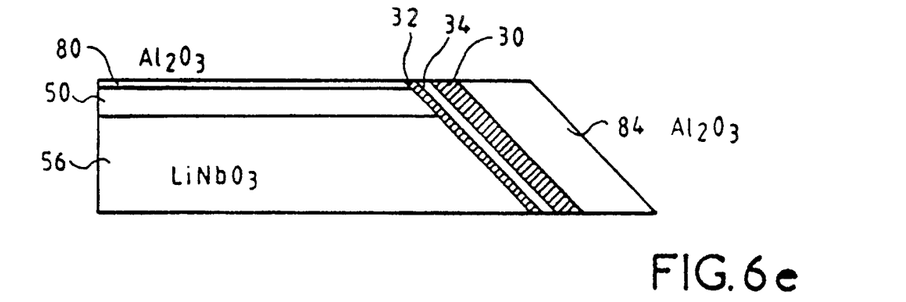

The upper surface of the substrate is then eroded mechanically, along a strictly horizontal plane, first of all with a hard abrasive to remove the protection layer 84 and then with a softer abrasive to remove the silica layer.

The machining is stopped when the alumina layer 80 is reached (FIG. 6e).

Figure 6F:
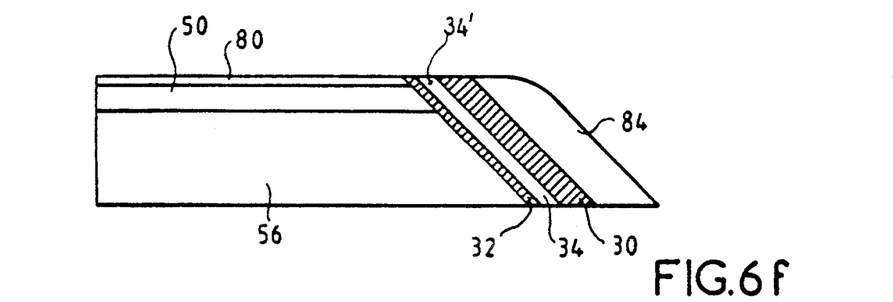

The machining operation is ended by a machining with an abrasive tape to make a rounded feature of some micrometers on the external layer of alumina 84, for this part will rub on the magnetic tape and should not wear it out to an exaggerated extent (FIG. 6f).

An anti-reflection layer 86 is finally deposited on the lower face of the substrate, to facilitate the exit of the modulated reflected beam, and also on the entry face 55 machined to 90°, to facilitate the entry of the illumination beam.

Figure 6G:
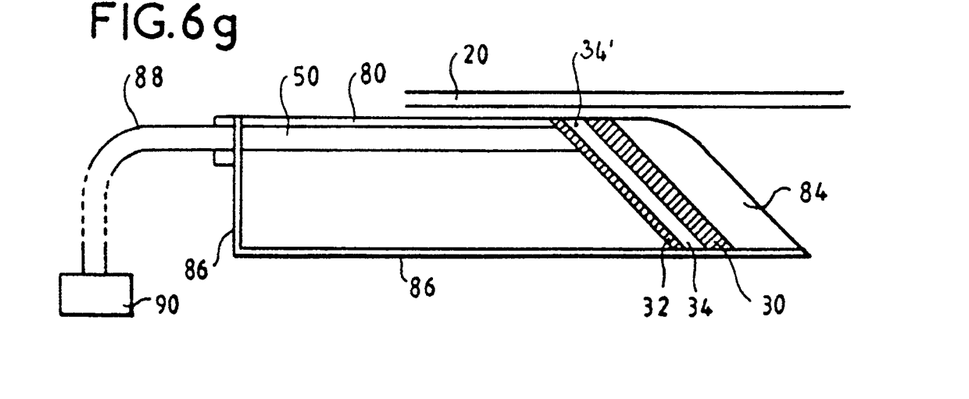

Finally, an optical fiber 88 or a layer of optical fibers is bonded against the entry face 55, facing the edge of the waveguide 50. A laser diode 90 may be placed at the other end of the fiber. The laser diode could also be bonded directly against the face 55 facing the waveguide (FIG. 6g).

Another manufacturing technique is shown in FIGS. 7a to 7g.

This is a planar technique, i.e. deposits are made only on the upper face of a substrate.

Two possibilities may be envisaged as explained here above: the deposition of the waveguide and of the magnetic layers on a transparent substrate or, more advantageously, deposition on the upper face of a photosensitive sensor on the photosensitive side.

Figure 7A:
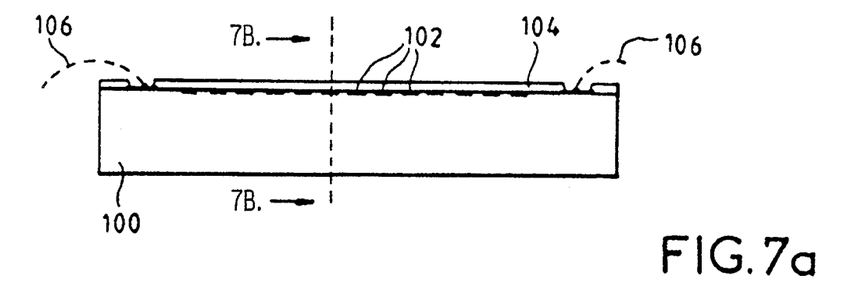
FIGS. 7a to 7g show the steps of manufacture for a second manufacturing method (using direct planar technology)

The latter example shall be described: however, we shall not describe the making of the sensor itself which is a silicon chip bearing a conventional linear array, for example an array of 16 to 256 dots in line, extending for example over a total of 8 millimeters, namely the width of a magnetic tape.

FIG. 7a gives a schematic view of the array 100, with its photosensitive elements 102, in a transversal view along the array. It is recalled that the array will be aligned in a plane parallel to the magnetic tape and in principle (but not obligatorily) transversally to the direction in which this tape moves past.

The array is covered with a planarization layer 104, for example of silica or silicon nitride; it is electrically connected to the exterior by connections 106 which will make it possible to collect signals representing the modulation of the illumination beam by the magneto-optical layer. The connections are represented by dashes for they will be soldered only at the end of the manufacturing process.

Figure 7B:
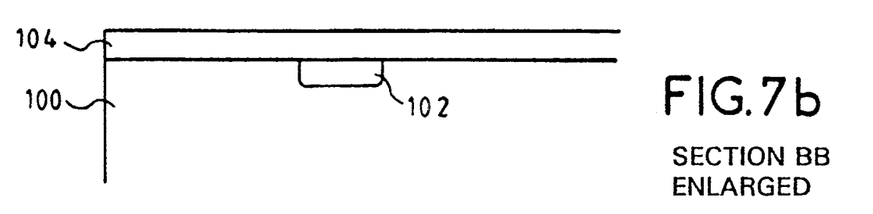

FIG. 7b shows a section in the other direction, i.e. transversally to the alignment of the photosensitive elements of the array, along the line BB of FIG. 7a. The dimensions, however, are considerably enlarged to show the details of the subsequent part of the manufacturing method. A photosensitive element 102 is represented, in symbolic form, by a rectangle. The relative position of the photosensitive elements with respect to the magneto-optical layer is clearly an important factor.

Figure 7C:
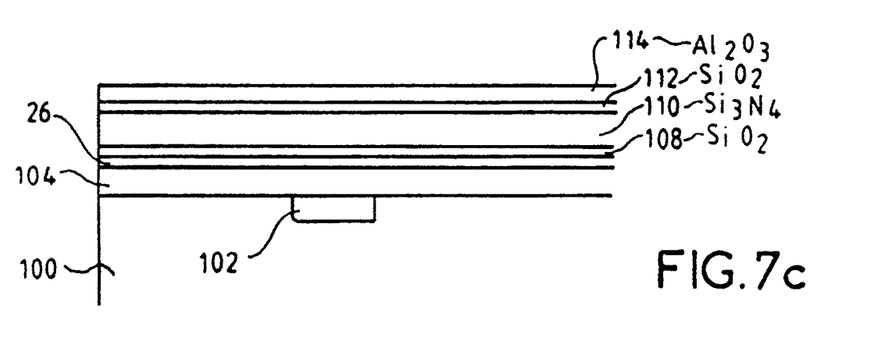

On the planarization layer 104, there is formed the optical polarization analyzer 26 layer which is a metal deposit followed by an etching defining apertures in parallel lines (FIG. 7c).

A plane transparent layer 108 with a low refraction index (made of silicon oxide for example) is then deposited. It has the role, essentially, of demarcating the lower plane of the waveguide. It may be very thick or very thin depending on requirements.

A transparent layer 110 with a higher refraction index (for example silicon nitride) is then deposited. This layer 110 defines the waveguide proper. Its thickness ranges from some hundreds of angstroms to some micrometers.

Then a transparent layer 112 with a low refraction index is deposited to demarcate the upper plane of the waveguide. It may be silicon oxide. Its thickness is small so that the waveguide remains in the immediate vicinity of the final upper face of the reading head.

An abrasion-resistant layer 114, for example alumina on a thickness of several thousands of angströms, is deposited. The layer 114 and the layer 112 could be one and the same layer if the refraction indices permit this.

Figure 7D:
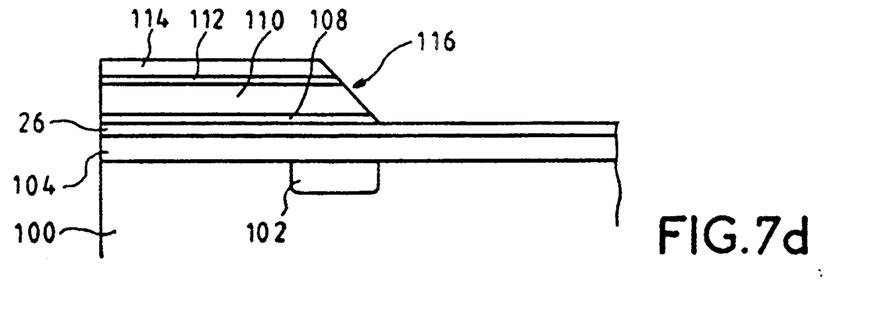
Figure 7E:
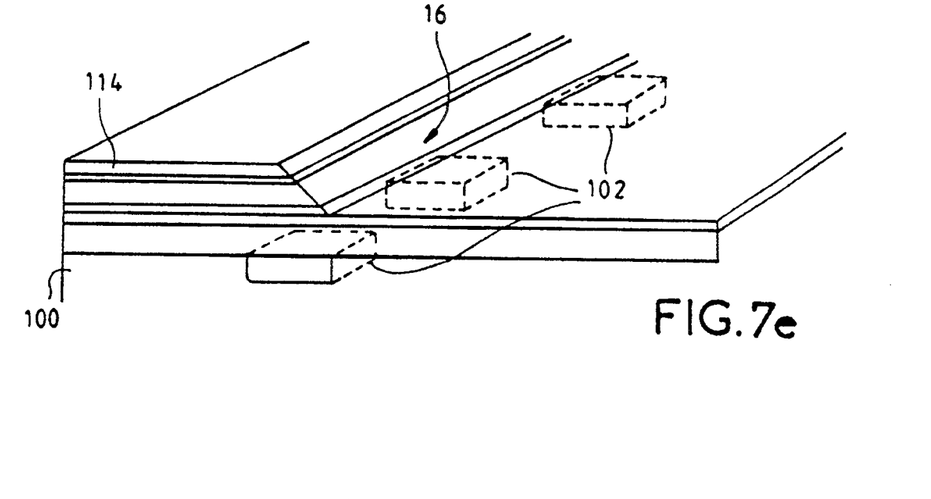

Then, either mechanically or by other means (oblique directional etching, laser etc.), an oblique step 116 is machined in the overlapping of layers thus created. The step is dug out at least throughout the thickness of the layers 110 to 114. It extends throughout the length of the head, transversally to the direction in which the tape moves past, above the alignment of photosensitive elements (FIG. 7d; FIG. 7e in perspective).

The obliqueness of the flank of the step is preferably equal to 45° so that a horizontal radiation coming from the waveguide is reflected vertically downwards. If the obliqueness is different, the operation is still possible but the position of the step should be planned accordingly so that the reflected beam truly reaches the photosensitive elements 102.

An optical index matching layer 118 is then deposited. This layer covers the two offset horizontal surfaces of the upper face of the substrate and also the oblique flank of the step. This step is useful only on the flank of the step, but it may remain without any disadvantage on the horizontal surfaces. It has the role of facilitating the exit of the illumination beam through the oblique edge of the waveguide.

Figure 7F:
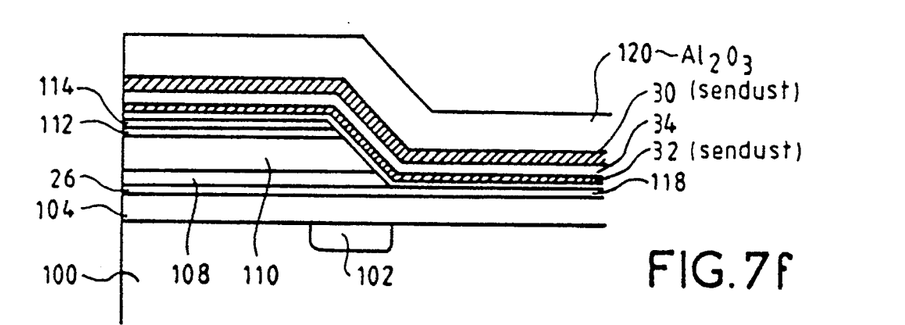

Then, a very fine first layer of magnetic material (sendust) 32, a non-magnetic layer 34 with a thickness of some thousands of angströms and another thicker layer of magnetic material 30 are deposited in succession.

Finally, a hard, abrasion-resistant layer 120, made of alumina for example, is deposited (FIG. 7f).

Figure 7G:
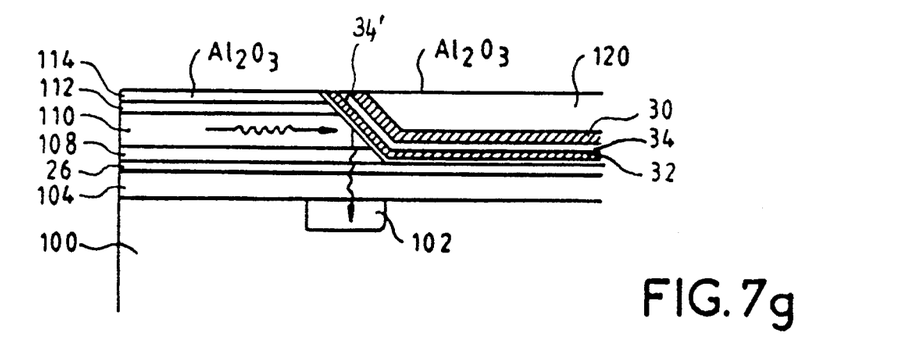

The next step consists in mechanically eroding the horizontal upper surface of the substrate to a depth sufficient to eliminate the magnetic layers on the upper part of the step 16, while at the same time leaving these layers on the lower part and also leaving, on this part, a thickness of layer 120 which will be used to protect the magnetic layers against wearing out by the magnetic tape.

In practice, the erosion is stopped when the layer 114 above the waveguide 110 is reached. The waveguide is therefore also protected against wear (FIG. 7g).

As above, provision is made, for example, for bonding an optical fiber or, better still, a layer of optical fibers, or directly a strip of laser diodes to the flush end of the waveguide 110, on the head side. The electrical signal output is done at the connections 106 mentioned with reference to FIG. 7a.

Another promising technique of manufacture is described with reference to FIGS. 8a to 8d.

This is again a planar technique, but one using a substrate transfer.

Figure 8A:
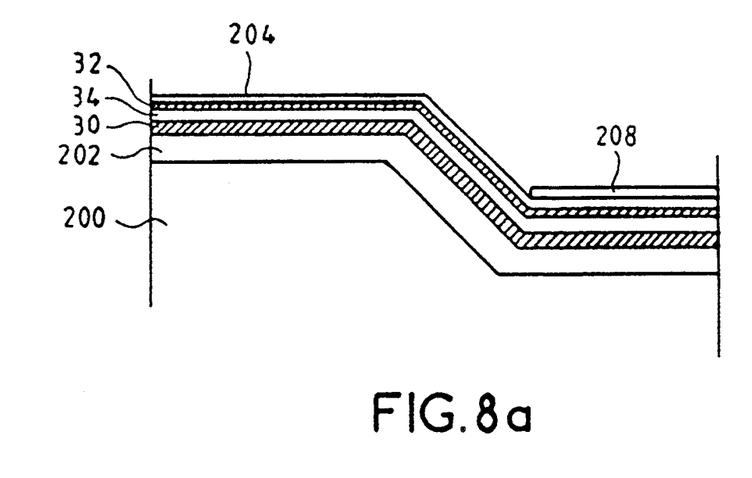
FIGS. 8a to 8d show the steps of manufacture for a third manufacturing method (using planar technology with transfer of substrates).
Figure 8B:
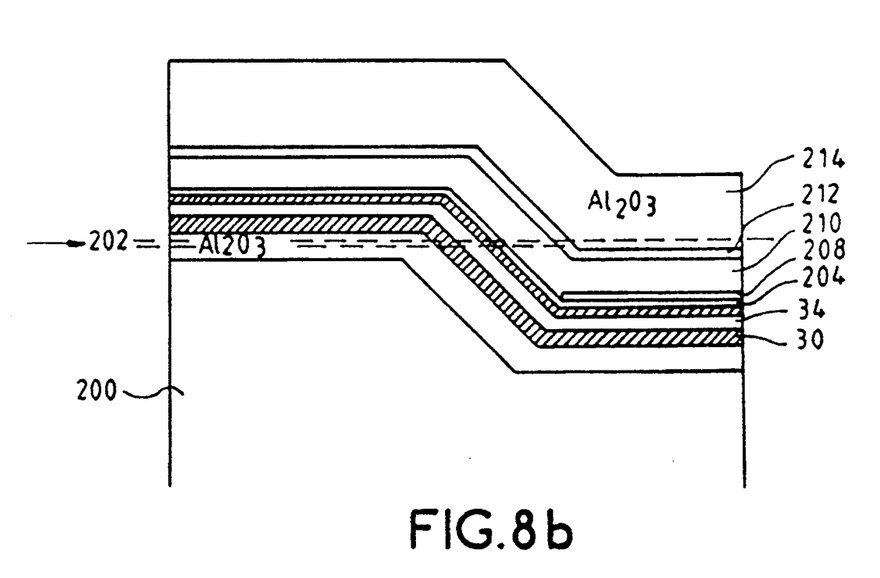

This method starts with a first substrate 200, which does not need to be transparent, on which an oblique step (at 45° for example) is machined by chemical or mechanical means.

An abrasion-resistant layer 202 is deposited; then a first magnetic layer 30, a gap layer 34 and a very thin magnetic layer 32 are deposited.

Then, preferably, an optical matching transparent layer 204 is deposited. This layer will subsequently facilitate the exit of the illumination beam from the waveguide towards the thin magnetic layer 32.

Then a transparent layer 208 is deposited. This layer 208 will be one of the walls of the optical waveguide and should therefore have a low refraction index. This layer 208 is then eliminated selectively on the oblique flank of the step so as to leave it only on the horizontal surfaces. This elimination is necessary for the illumination beam to reach the magneto-optical layer 32 (FIG. 8a).

The following are then deposited (FIG. 8b) successively: the layer 210 forming the guide proper, with a higher refraction index than the layer 208, another layer 212 with a lower refraction index, similar to the layer 208 and forming the other plane face of the waveguide; then a protection layer 214, made of alumina for example, which in principle is as high as the oblique step.

The substrate is then eroded by its upper face, up to the layer 202 at the top of the step. Thus, a plane surface has been created (FIG. 8c), the part of the magnetic circuit that rises at 45° being flush with this plane surface. The plane of the waveguide is very close to the eroded upper face (at a distance of some micrometers from it or closer if possible).

Figure 8C:
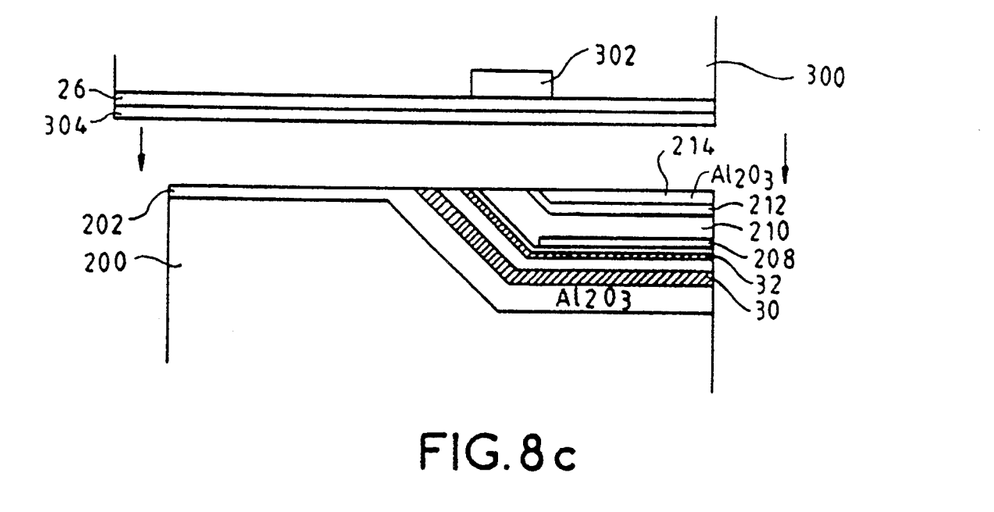

This eroded face is bonded against the plane face of a photosensitive sensor (in principle a linear array of photosensitive elements 302 formed on a substrate 300). The photosensitive sensor is preferably covered with an optical polarization analyzer layer 26 and a planarization layer 304. The relative positioning of the two substrates 200 and 300 is naturally done in such a way that the outgoing light beam modulated by reflection on the thin layer 32 reaches a position facing the photosensitive elements 302.

Figure 8D:
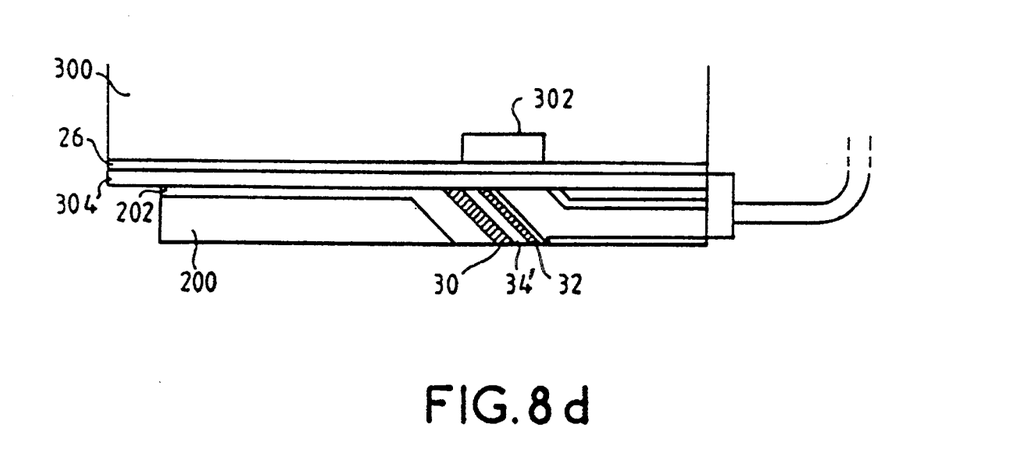

The substrate 200 is then eroded by its rear face until it is made to completely disappear. The machining is stopped when the layer 208, demarcating the waveguide, is reached. The rising part of the magnetic circuit 30, 32, 34 is then flush with the rear face of what remains of the substrate 200. This flush part will be facing the magnetic tape.

Here again, the beam may be introduced by an optical fiber or a bundle of optical fibers bonded to the edge of the substrate facing the opening of the optical guide (FIG. 8d).

The entire foregoing description has been made in assuming that the optically active part of the reading head is reflective and that the modulated beam is the reflected beam. However, the magneto-optical effect exists also in transmission mode if the magneto-optical layer is thin enough, and the invention may be transposed to this case.

What is claimed is:

1. An optical reading system for reading magnetic information elements recorded on a movable magnetic medium, said system comprising:
   a light source for generating a light beam;
   a reading head comprising:
      a substrate;
      a magnetic circuit formed on the substrate, said magnetic circuit including an optically active magnetic region for receiving and modulating said light beam and a non-magnetic gap region placed in the immediate vicinity of said optically active magnetic region, said gap region being narrow and elongated in a predetermined direction transverse to a direction of movement of the magnetic medium;
      a flat optical waveguide integrally formed in the substrate, for configuring said light beam in a form of a flat light beam and propagating said flat light beam in a direction perpendicular to said predetermined direction, and for impinging said light beam onto said optically active magnetic region, the plane of the flat waveguide being parallel to said predetermined direction.

2. An optical reading system according to claim 1, wherein the optical magnetic layer comprises a planar portion onto which said flat light beam impinges, said planar portion extending in a plane parallel to said gap and oblique to said flat waveguide.

3. An optical reading system according to claim 1, further comprising means for moving the magnetic medium with respect to said reading head in a displacement direction, wherein said predetermined direction of elongation of said gap is perpendicular to said displacement direction.

4. An optical reading system according to any one of claims 1, 2, or 3, wherein the flat optical waveguide has a height on an order of one micrometer and a width of several millimeters.

5. An optical reading system according to any one of claims 1, 2, or 3, further comprising a magnetic recording medium bearing a plurality of parallel tracks of magnetic information, wherein the optical waveguide and the optically active magnetic region have a width in the direction of the elongated gap, said width extending throughout said plurality of parallel tracks of magnetic information, so that all of the plurality of tracks are read in parallel.

6. An optical reading system according to any one of claims 1, 2, or 3, wherein the optical waveguide and the optically active magnetic region are formed by deposition of thin layers on a common main surface of the substrate.

7. An optical reading system according to any one of claims 1, 2 or 3, including a linear photosensitive array spaced from the optically active magnetic region and means for directing a modulated light beam between the optically active magnetic region and the linear photosensitive array, wherein a modulated light beam reflected by said optically active magnetic region is directed onto the linear photosensitive array.

8. An optical reading system according to claim 7, wherein said linear photosensitive array is placed at a distance of at most 10 microns from the optically active magnetic region along the path of the modulated beam.

9. An optical reading system according to claim 8, wherein said optically active magnetic region layer and said waveguide comprise thin layers deposited on said substrate and said substrate also includes the linear photosensitive array.

10. An optical reading system for reading magnetic information elements recorded on a movable magnetic medium, said system comprising:
    a light source for generating a light beam;
    a reading head comprising:
       a substrate;
       a magnetic circuit formed on the substrate, said magnetic circuit including an optically active magnetic region for receiving and modulating said light beam and a non-magnetic gap region placed in the immediate vicinity of said optically active magnetic region, said gap region being narrow and elongated in a predetermined direction transverse to a direction of movement of the magnetic medium;
       a linear array of photosensitive elements, said linear array of photosensitive elements being spaced from the optically active magnetic region and extending in a direction parallel to said predetermined direction, said photosensitive elements being placed at a distance less than about 100 microns from said optically active magnetic layer.

11. An optical reading system according to claim 10, wherein said distance between the linear array of photosensitive elements and said optically active magnetic region is less than 10 micrometers.

12. An optical reading system for reading magnetic information elements recorded on a movable magnetic medium, said system comprising:
    a light source for generating a light beam;

a reading head comprising:
  a substrate;
  a magnetic circuit formed on the substrate, said magnetic circuit including an optically active magnetic region for receiving and modulating said light beam and a non-magnetic gap region placed in the immediate vicinity of said optically active magnetic region, said gap region being narrow and elongated in a predetermined direction transverse to a direction of movement of the magnetic medium;
  means for directing the light beam onto said optically active magnetic region as a flat beam;
  a linear array of photosensitive elements, said linear array of photosensitive elements being spaced from the optically active magnetic region and extending in a direction parallel to said predetermined direction, said photosensitive elements being placed close to said optically active magnetic region without any focussing elements or waveguiding elements interposed between said optically active magnetic region and said linear array.

13. An optical reading system according to claim 12, wherein the optically active magnetic region is at a distance less than about 100 micrometers from the linear array Of photosensitive elements.

14. An optical reading system according to claim 12, wherein the optically active magnetic region is at a distance less than about 10 micrometers from the linear array of photosensitive elements.

* * * * *